United States Patent
Russell et al.

(10) Patent No.: US 8,151,258 B2
(45) Date of Patent: Apr. 3, 2012

(54) MANAGING SOFTWARE PATCHES

(75) Inventors: Michael D. Russell, Van Nuys, CA (US); Justin E. Killen, Covina, CA (US); Alexander Chernyakhovsky, Woodland Hills, CA (US)

(73) Assignee: iPass Inc.

( * ) Notice: Subject to any disclaimer, the term of this patent is extended or adjusted under 35 U.S.C. 154(b) by 657 days.

(21) Appl. No.: 11/076,813

(22) Filed: Mar. 9, 2005

(65) Prior Publication Data
US 2006/0206757 A1 Sep. 14, 2006

(51) Int. Cl.
G06F 9/44 (2006.01)
(52) U.S. Cl. ........................ 717/172; 717/177
(58) Field of Classification Search ........... 717/168–178
See application file for complete search history.

(56) References Cited

U.S. PATENT DOCUMENTS

| | | | |
|---|---|---|---|
| 5,867,714 A | 2/1999 | Todd et al. | |
| 6,182,275 B1 * | 1/2001 | Beelitz et al. | 717/175 |
| 6,578,142 B1 | 6/2003 | Anderson et al. | |
| 6,606,744 B1 * | 8/2003 | Mikurak | 717/174 |
| 6,745,385 B1 * | 6/2004 | Lupu et al. | 717/163 |
| 6,763,517 B2 * | 7/2004 | Hines | 717/124 |
| 6,915,513 B2 * | 7/2005 | Duesterwald et al. | 717/168 |
| 6,968,550 B2 * | 11/2005 | Branson et al. | 717/168 |
| 6,990,660 B2 * | 1/2006 | Moshir et al. | 717/171 |
| 7,055,146 B1 * | 5/2006 | Durr et al. | 717/162 |
| 7,062,765 B1 * | 6/2006 | Pitzel et al. | 717/177 |
| 7,080,371 B1 * | 7/2006 | Arnaiz et al. | 717/170 |
| 7,096,464 B1 * | 8/2006 | Weinmann | 717/169 |
| 7,117,494 B2 * | 10/2006 | Rajaram | 717/174 |
| 7,155,714 B2 * | 12/2006 | Makris et al. | 717/176 |

FOREIGN PATENT DOCUMENTS

WO WO-2006096837 A3 9/2006

OTHER PUBLICATIONS

Bigfix, "Evaluating Patch Management Solution Architecture: Scanning vs. Agent", 2004, BigFix, Inc., pp. 1-4.*
PatchLink Update, "Cross-platform Security Patch Management", 2002, Patchlink Inc., version 4.0, pp. 1-18.*
PatchLink, "Eliminates Overtimes, Worries & Risks", 2003, Patchlink Inc., pp. 1-3.*
"International Search Report for corresponding PCT Application No. PCT/US06/08562", (Apr. 20, 2007), 2 pgs.

* cited by examiner

*Primary Examiner* — Ted T Vo
(74) *Attorney, Agent, or Firm* — Delizio Gilliam, PLLC

(57) ABSTRACT

In one embodiment, the method includes determining a first set of software patches based on a group of software patches installed on a computing device and a group of available software patches. The method can also include receiving the first set of software patches over a network connection. The method can also include determining, after receiving the first set of software patches, a second set of software patches based on the group of software patches installed on the computing device and the first set of software patches, wherein the group of installed software patches has changed since determining the first set. The method can also include installing on the computing device the second set of software patches.

16 Claims, 8 Drawing Sheets

MANAGING SOFTWARE PATCHES

BACKGROUND

1. Field

This application relates generally to the field of updating software systems and more particularly to the field of managing and installing software patches.

2. Description of Related Art

Software manufactures often deliver robust software systems that operate relatively maintenance-free. However, software products can exhibit problems that need specific attention (e.g., compatibility problems, anomalous results, security vulnerabilities, etc.). Software manufacturers typically address these problems by releasing software patches, which include software code aimed at fixing troubled parts of a software system. Software patches can be electronically distributed and integrated into software systems in the field.

Because software manufacturers can release dozens of patches for large software systems, organizations can become overly burdened with managing and updating patches for several large software systems. Patch management systems help ease this burden. Patch management systems are designed to assist system administrators in procuring patches from software manufacturers and distributing patches to large numbers of computer systems. Patch management systems fall into at least two categories: 1) agent-based systems and 2) non-agent based systems. Agent-based patch management systems call for an agent program to be installed on each computer that is serviced by the system. Agents typically gather and send information about each computer to a central controller. The agents may also install and configure patches. Non-agent based systems do not have an agent on each computer; instead, non-agent systems carry-out tasks remotely.

Electronically distributing patches can be challenging, even for automated patch management systems. Although communications networks can achieve very high speeds, network congestion, transmission errors, connection failure, and other problems can significantly hamper electronic software patch distribution. For example, many file transmission protocols do not resume transmissions after failed connections. Consequently, if a connection fails before a patch management system delivers a patch, the entire process must be repeated from the beginning. As a result, poor connectivity typically stifles patch distribution.

BRIEF DESCRIPTION OF THE FIGURES

Embodiments of present invention are illustrated by way of example and not limitation in the Figures of the accompanying drawings in which.

DESCRIPTION OF THE EMBODIMENTS

A system and method for managing software patches are described herein. In this description, "software patch" and "patch" are used interchangeably.

This description of the embodiments is divided into four sections. The first section presents an introduction, while the second section describes an exemplary operating environment and system architecture. The third section describes exemplary operations and the fourth section provides some general comments.

Introduction

This section introduces a system for managing software patches. In particular, this section describes an agent-based software patch management system in which an agent installs software patches received from a command server. Additional details are provided below, in the discussion of FIG. 1.

Figure 1:
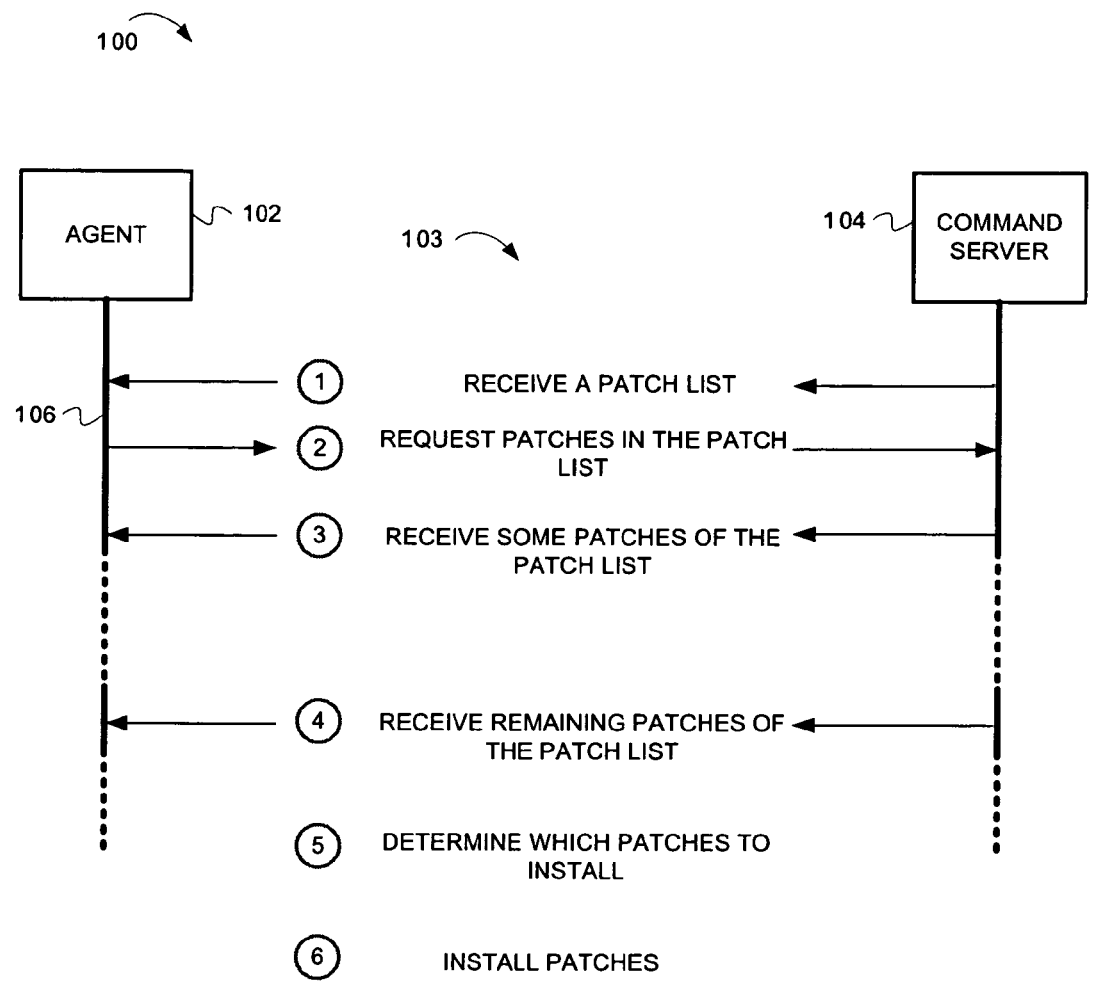
FIG. 1 is a dataflow diagram illustrating dataflow attendant to installing software patches over a transitory network connection, according to embodiments of the invention.

FIG. 1 is a dataflow diagram illustrating dataflow attendant to installing software patches over a transitory network connection, according to embodiments of the invention. In FIG. 1, communications occur over a transitory network connection between an agent 102 and a command server 104. The agent 102 resides on a computer system, which is not shown in FIG. 1. In FIG. 1, a connection indicator 106 indicates whether the network connection 103 is operating properly or whether it is suffering problems (e.g., complete inoperability, reduced transmission rates, and/or errant transmissions). In particular, a solid line indicates the network connection 103 is operating properly, while a broken line indicates the network connection 103 is not working properly. The dataflow 100 of FIG. 1 is divided into 6 stages.

At stage 1, the agent 102 receives a patch list from the command server 104. The patch list indicates patches that are currently available for download and installation by the agent 102. The agent 102 can determine which patches to request based on the patch list and patches already installed on agent 102.

At stage 2, the agent 102 requests from the command server 104 patches in the patch list.

At stage 3, the agent 102 receives some of the patches in the patch list. However, before the agent 102 receives all patches in the patch list, the network connection 103 becomes inoperable for a relatively long time (e.g., hours, days, or weeks). The agent 102 will receive the remainder of the patches in the patch list after the network connection 103 becomes operable.

At stage 4, while the network connection 103 is operating properly, the agent receives all remaining patches of the patch list.

At stage 5, the agent 102 determines which patches should be installed. During stage 5, the agent 102 may discover that patches substantially similar to those received at stages 3 and 4 are installed on the agent's computer system. In one embodiment, the agent 102 installs only patches that do not correspond to similar patches already installed on the agent's computer system (not shown).

Although FIG. 1 shows the agent 102 receiving patches from the command server 104, the agent 102 can receive patches from an alternative source (e.g., a server operated by the patch manufacturer).

Hardware, Operating Environment, and System Architecture

This section describes an example system architecture and example hardware that can be used with embodiments of the invention. Operations of the system components will be described in the next section.

System Architecture

Figure 2:
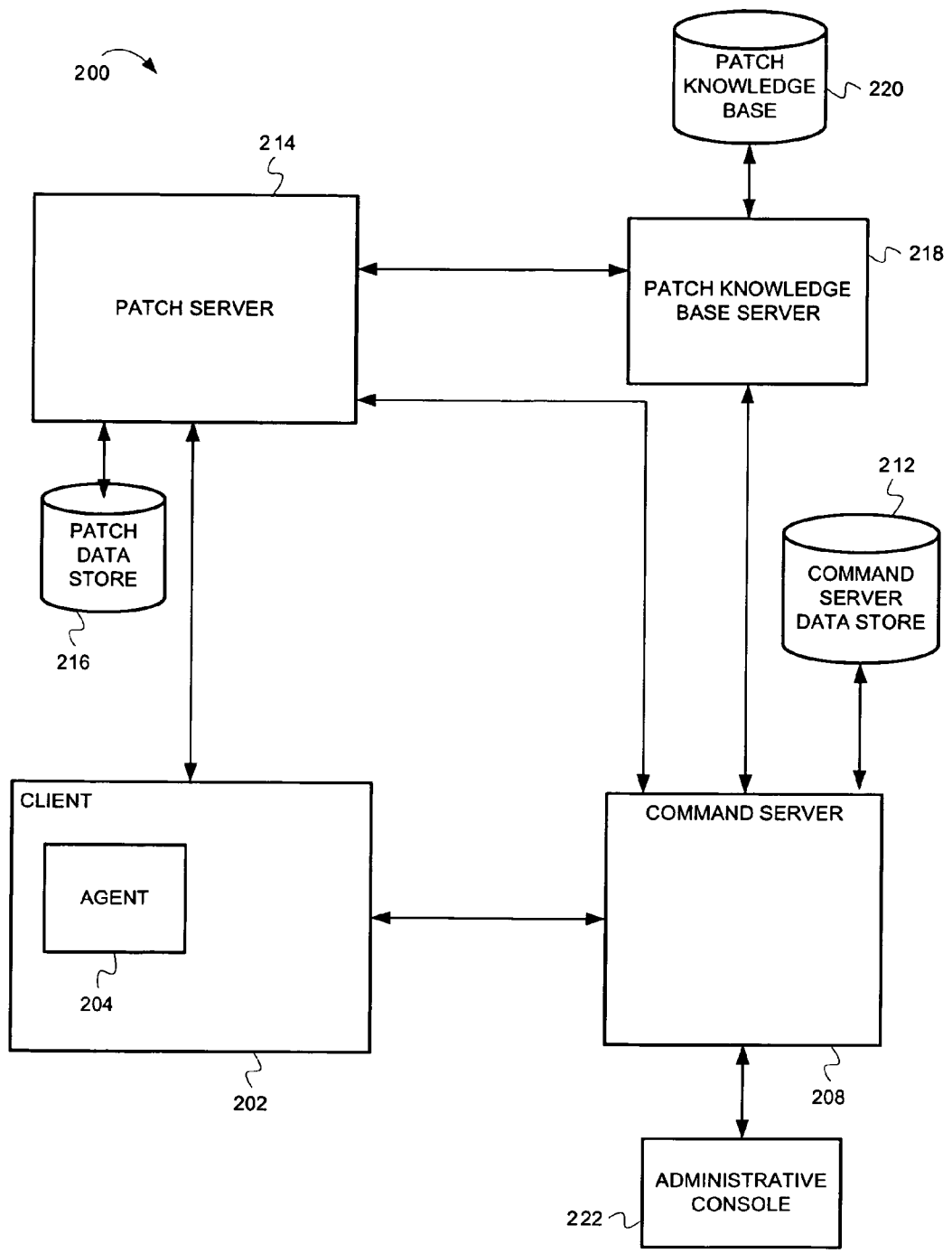
FIG. 2 is a block diagram illustrating a system for managing software patches, according to exemplary embodiments of the invention.

FIG. 2 is a block diagram illustrating a system for managing software patches, according to exemplary embodiments of the invention. The system 200 includes a client 202, which includes an agent 204. The client 202 is connected to a patch server 214 and a command server 208. The command server 208 is connected to an administrative console 222, command server data store 212, patch knowledgebase server 218, and patch server 214. The patch server 214 is connected to a patch data store 216 and the patch knowledgebase server 218 is connected to a patch knowledgebase 220. Operations of the system components will be described below, in the next section.

The system components can be connected over any suitable network connection, such as Ethernet, 802.11x, public switched telephone network, and integrated services digital network. In one embodiment, the network connection may transmit data over the Internet.

The client 202 can be a laptop computer, desktop computer, personal digital assistant, smart phone, or any other suitable computing device. The agent 204 can be software for procuring and installing software patches on the client 202.

The command server 208 can store a list of patches available for installation on the client 202. Additionally, the command server can also create and store patch configuration data associated with the patches. The command server 208 can present patch information (e.g., list of patches and/or patch configuration data) to an administrator via the administrative console 222. The list of patches and/or the patch configuration data can be stored in the command server data store 212.

The patch knowledgebase server 218 and the patch knowledgebase 220 process and store information related to patches that are available for installation on the client 202. The patch knowledgebase server 218 and transmit this information to the command server 208.

The patch server 214 and the patch data store 216 can store patches available for installation on the client 202. In one embodiment, the agent 204 can download patches directly from the patch server 214, while in another embodiment, the agent 204 can download patches from the command server 208.

Any of the components of the agent 204 and the command server 208 can include machine-readable media including instructions for performing operations described herein. Machine-readable media includes any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc. According to embodiments of the invention, the components described herein can be other types of logic (e.g., firmware or digital logic) for executing the operations for managing software patches described herein.

Figure 3:
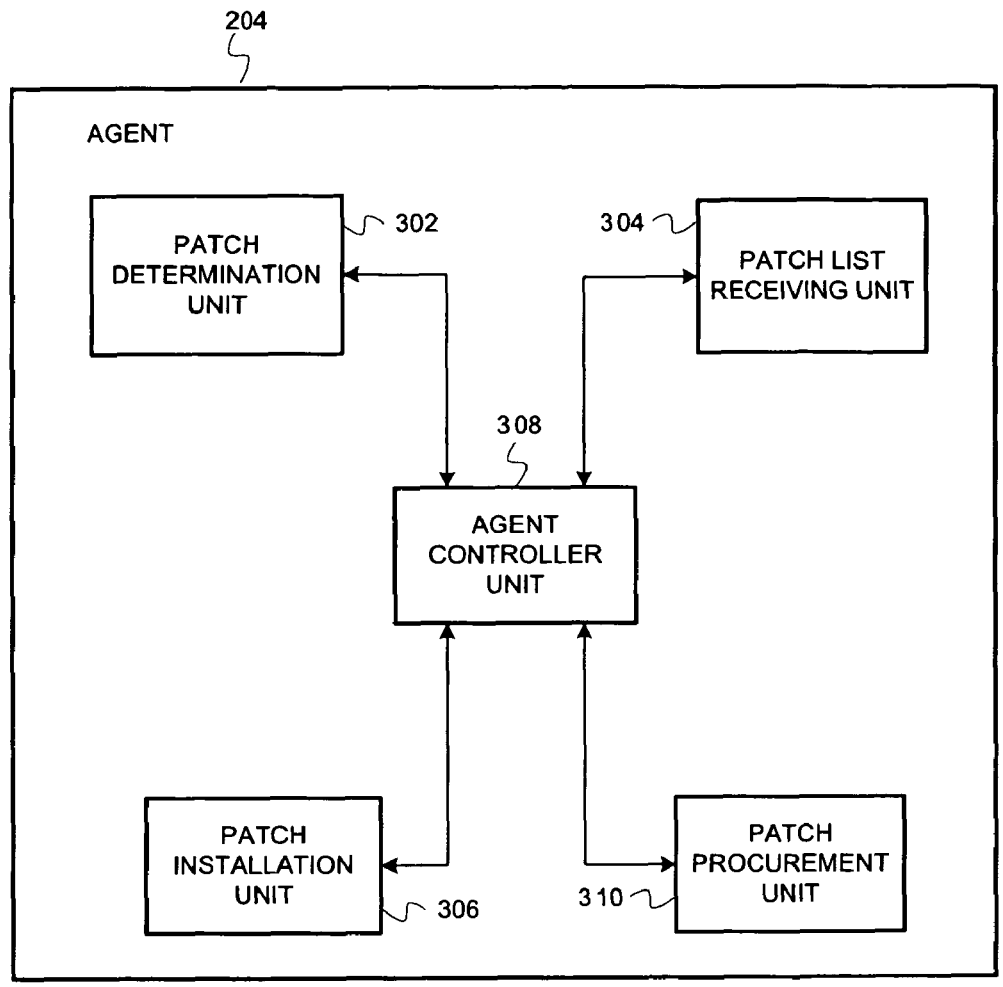
FIG. 3 is a block diagram illustrating an agent, according to exemplary embodiments of the invention.

While FIG. 2 describes, several components of a system for managing software patches, FIG. 3 presents a more detailed view of an agent.

FIG. 3 is a block diagram illustrating an agent, according to exemplary embodiments of the invention. As shown in FIG. 3, the agent 204 includes an agent controller unit 308. The agent controller unit 308 is connected to a patch determination unit 302, patch installation unit 306, patch list receiving unit 304, and patch procurement unit 310. Operations of the agent and its components will be described below, in the next section.

Hardware and Operating Environment

Figure 4:
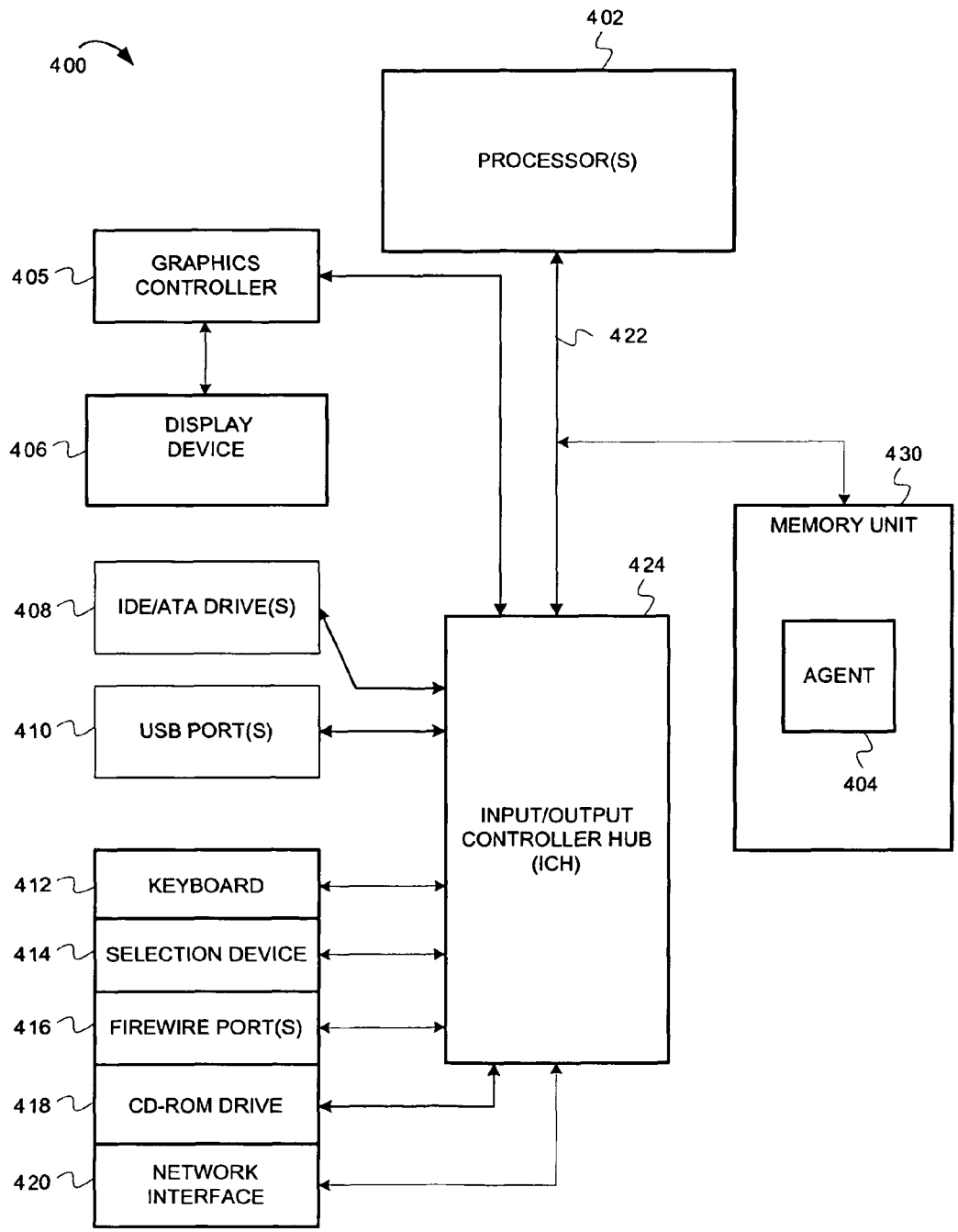
FIG. 4 illustrates an exemplary computer system used in conjunction with certain embodiments of the invention.

FIG. 4 illustrates an exemplary computer system used in conjunction with certain embodiments of the invention. As illustrated in FIG. 4, computer system 400 comprises processor(s) 402. The computer system 400 also includes a memory unit 430, processor bus 422, and Input/Output controller hub (ICH) 424. The processor(s) 402, memory unit 430, and ICH 424 are coupled to the processor bus 422. The processor(s) 402 may comprise any suitable processor architecture. The computer system 400 may comprise one, two, three, or more processors, any of which may execute a set of instructions in accordance with embodiments of the invention.

The memory unit 430 includes an agent 404. The memory unit 430 stores data and/or instructions, and may comprise any suitable memory, such as a dynamic random access memory (DRAM). The computer system 400 also includes IDE drive(s) 408 and/or other suitable storage devices. A graphics controller 405 controls the display of information on a display device 406, according to embodiments of the invention.

The input/output controller hub (ICH) 424 provides an interface to I/O devices or peripheral components for the computer system 400. The ICH 424 may comprise any suitable interface controller to provide for any suitable communication link to the processor(s) 402, memory unit 430 and/or to any suitable device or component in communication with the ICH 424. For one embodiment of the invention, the ICH 424 provides suitable arbitration and buffering for each interface.

For one embodiment of the invention, the ICH 424 provides an interface to one or more suitable integrated drive electronics (IDE) drives 408, such as a hard disk drive (HDD) or compact disc read only memory (CD ROM) drive, or to suitable universal serial bus (USB) devices through one or more USB ports 410. For one embodiment, the ICH 424 also provides an interface to a keyboard 412, a mouse 414, a CD-ROM drive 418, one or more suitable devices through one or more firewire ports 416. For one embodiment of the invention, the ICH 424 also provides a network interface 420 though which the computer system 400 can communicate with other computers and/or devices.

In one embodiment, the computer system 400 (without the agent 404) can be employed as a command server. In one embodiment, the computer system 400 includes a machine-readable medium that stores a set of instructions (e.g., software) embodying any one, or all, of the computer-implemented methods for managing patches described herein. Furthermore, software can reside, completely or at least partially, within memory unit 430 and/or within the processor(s) 402.

System Operations

This section describes operations performed by embodiments of the invention. In certain embodiments, the operations are performed by instructions residing on machine-readable media while in other embodiments, the methods are performed by hardware or other logic (e.g., digital logic).

Figure 5:
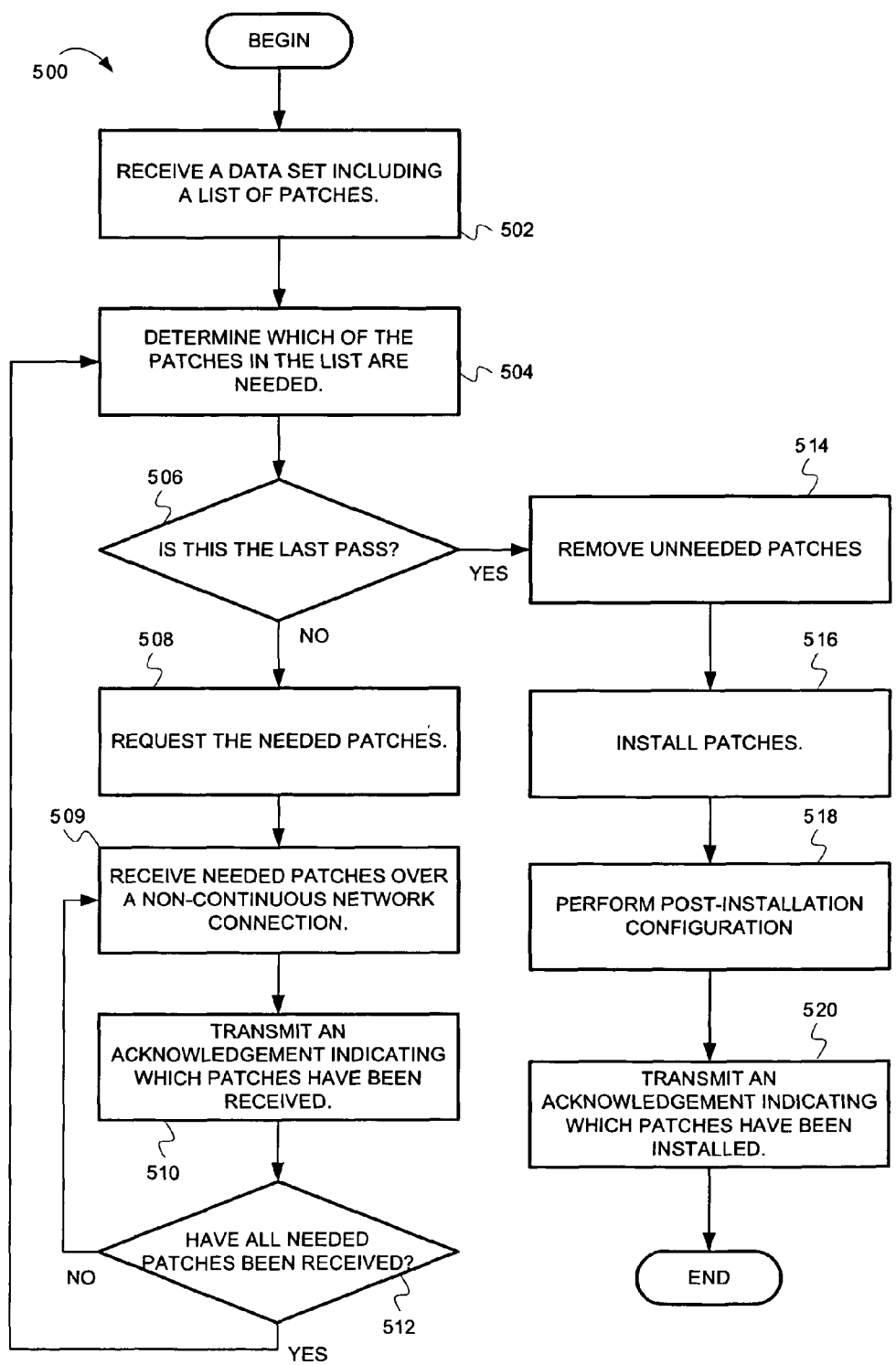
FIG. 5 is a flow diagram illustrating operations for procuring software patches needed by a computing device, according to exemplary embodiments of the invention.
Figure 6:
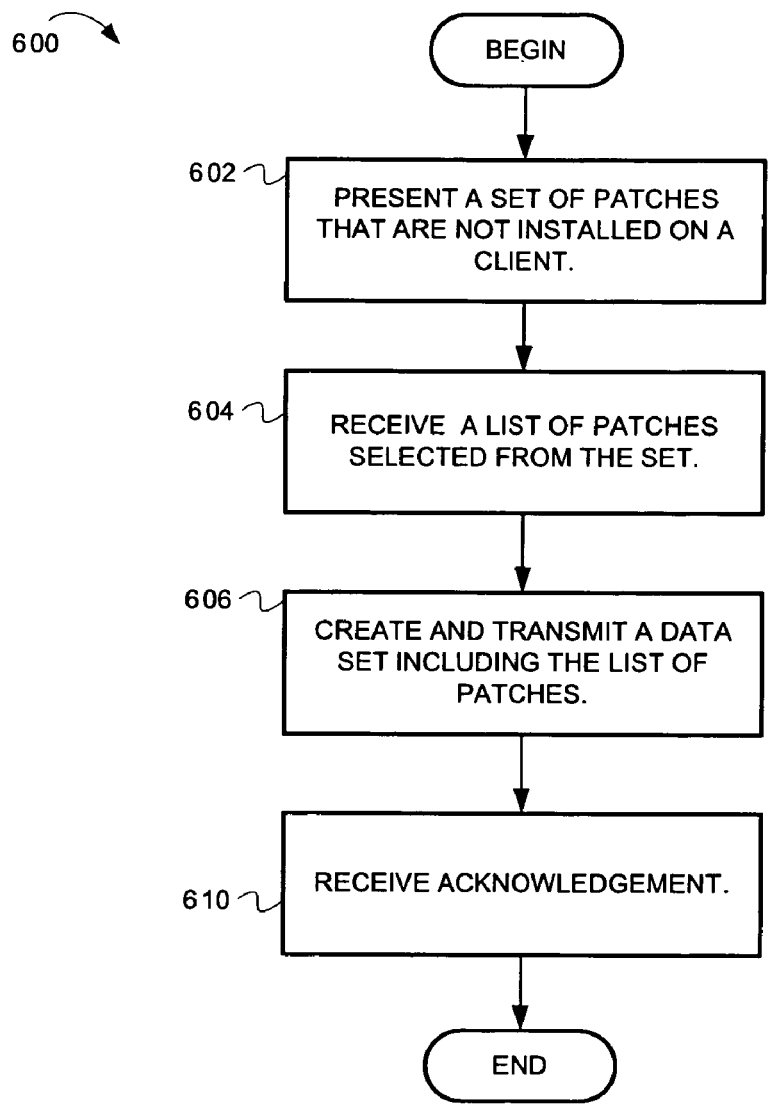
FIG. 6 is a flow diagram illustrating operations for selecting and transmitting patch lists, according to exemplary embodiments of the invention.
Figure 7:
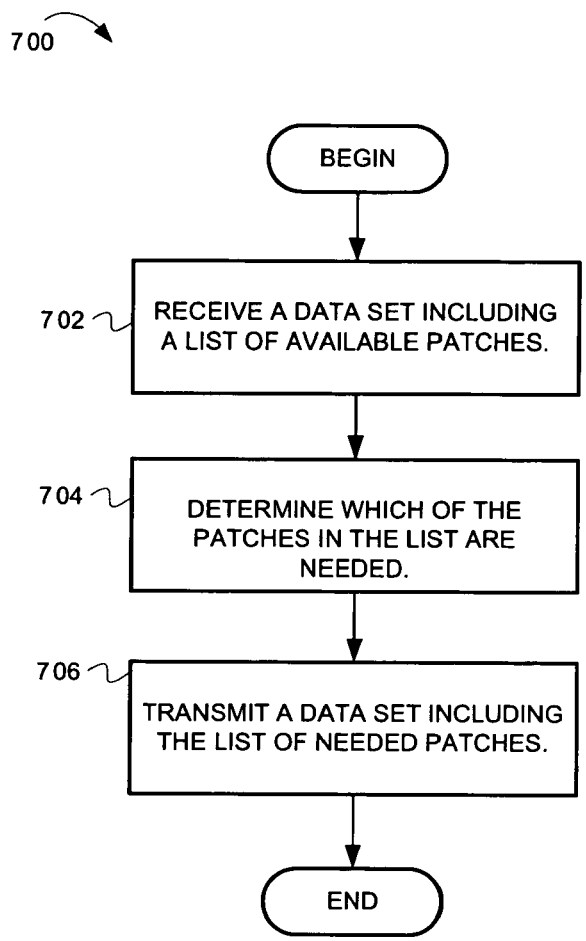
FIG. 7 is a flow diagram illustrating operations for determining and transmitting a list of patches needed by client, according to exemplary embodiments of the invention.
Figure 8:
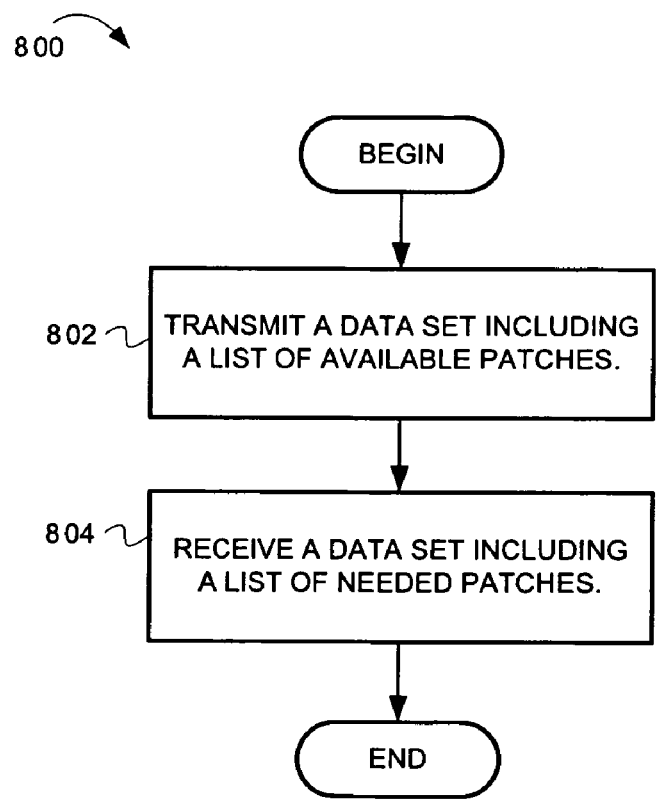
FIG. 8 is a block diagram illustrating receiving a list of patches needed by a client, according to exemplary embodiments of the invention.

FIGS. 5-8 are discussed below. In particular, FIGS. 5 and 6 describe operations for determining and procuring patches that may be needed by a computing device (e.g., a client). FIGS. 7 and 8 describe operations for determining what patches are installed on a computing device (e.g., a client) and storing the results on a server (e.g., a command server). This description will proceed with a discussion of FIG. 5.

FIG. 5 is a flow diagram illustrating operations for procuring software patches needed by a computing device, according to exemplary embodiments of the invention. The flow diagram 500 will be described with reference to the exemplary embodiments shown in FIGS. 2 and 3. The flow diagram 500 commences at block 502.

At block 502, a data set is received, where the data set includes a list of patches. For example, the agent's patch list receiving unit 304 receives a data set from the command server 208. The data set includes a list of patches, which indicates software patches that are available for installation on the client 202. For example, the list of patches could indicate that patches A, B, C, and D are available from installation on the client.

In one embodiment, the data set (received at block 502) can be represented as an extensible markup language (XML) file and can include information used for configuring and installing patches. The flow continues at block 504.

At block 504, a determination is made about which patches in the list are needed. For example, the agent's patch determination unit 302 determines which of the patches in the list are needed by the client 202. In one embodiment, the determination is based on patches already installed on the client 202 and the patch list (received at 502). For example, if a patch is in the list but not installed on the client, the patch may be needed. Because the agent 204 can determine which patches are needed, it can avoid expending time and resources installing and configuring unneeded patches.

In the flow 500, the operation at block 504 can be executed more than once. As a result, the client 202 can determine "needed patches" more than once. On an initial pass through block 504, the agent 204 may determine that patches A, B, C, and D are needed because those patches are available and not installed on the client 202. During a later pass, the agent 204 may determine that only patches C and D are needed because patches A and B (or patches identical to A and B) have been installed on the client 202.

There may be several circumstances where a patch is not determined to be installed on the client 202 on an initial pass through block 504, but where the patch is found to be installed on a later pass. For example, independent of the flow 500, a system administrator could install a patch on the client 202. During a second pass, the agent 204 could discover the installed patch.

In one embodiment, the agent 204 can execute a plurality of software processes, each independently performing the operations of the flow 500. After a first software process initially executes block 504, another software process may install patches on the client (i.e., another software process performs block 516). Upon a second pass through block 504, the first process may discover the installed patch. Because the agent 204 can determine which patches have been installed, it can avoid expending time and resources installing and configuring unneeded patches.

The flow continues at block 506.

At block 506, a determination is made about whether this is the last pass through block 504. If this is the last pass through block 504, the flow continues at block 514. Otherwise, the flow continues at block 508. In one embodiment, the flow 500 twice performs the operation at block 504.

At block 508, a request is made for the needed patches. For example, the agent's patch procurement unit 310 requests the needed patches from the command server 208. In one embodiment, the patch procurement unit 310 can request the needed patches from the patch server 214. The flow continues at block 509.

At block 509, needed patches are received over a non-continuous network connection. For example, the patch procurement unit 310 receives one or more of the needed patches over a non-continuous network connection. In one embodiment, the agent 204 may not receive all needed patches in one continuous download because the network connection may be intermittently inoperable or may suffer from degraded performance (e.g., erroneous transmissions). If the network connection is interrupted, the patch procurement unit 310 can resume receiving patches from the point at which it was interrupted. For example, if the network connection is interrupted after two thirds of a patch has been received, the patch procurement unit 310 resumes receipt of the remaining one third after the network connection is restored. The flow continues at block 510.

At block 510, an acknowledgment is transmitted to indicate which patches have been received. For example, the patch procurement unit 310 transmits to the command server 208 and/or the patch server 214 an acknowledgment indicating which patches have been received. The flow continues at block 508.

At block 512, a determination is made about whether all needed patches have been received. For example, the patch procurement unit 310 determines whether all the needed patches from the list (received at block 502) have been received. If all patches have been received, the flow continues at block 510. Otherwise, the flow continues at block 506.

The operations at blocks 509, 510, and 512 comprise a loop which allows the agent 204 to receive patches over a non-continuous network connection without restarting the entire flow. Thus, the agent 204 can avoid expending resources on restarting the flow.

At block 514, unneeded patches are removed. For example, the agent 204 deletes unneeded patches from the client 202. The flow continues at block 516.

At block 516, patches are installed. For example, the patch installation unit 306 installs the appropriate patches on the client 202. In one embodiment, the patch installation unit 306 installs the needed patches.

In one embodiment, the patch installation unit 306 determines which patches should be installed based on the patches received by the patch procurement unit 310, patches already installed on the client 202, and patch configuration information included in the data sets (received at block 502). The patch installation unit 306 may not install all received patches if 1) other required patches are missing; 2) the client 202 cannot be properly configured; or 3) alternative or identical patches have been installed before the received patches were ready for installation. There can be other reasons why the patch installation unit 306 may not install certain patches. The flow continues at block 514.

At block 518, post-installation configuration is performed. For example, the patch installation unit 306 performs post-installation configurations on the client 202. For example, the patch installation unit 306 can delete patch configuration information and patches, alter various software settings, and reboot the client 202. The flow continues at block 516.

At block 520, an acknowledgement is transmitted indicating which patches have been installed. For example, the patch installation unit 306 transmits acknowledgment to the command server 208, indicating which patches have been installed on the client 202. From block 516, the flow ends.

While FIG. 5 describes operations for receiving and installing patches, FIG. 6 describes operations for transmitting patch lists.

FIG. 6 is a flow diagram illustrating operations for selecting and transmitting patch lists, according to exemplary embodiments of the invention. The flow diagram 600 will be described with reference to the exemplary system shown in FIG. 2. The flow diagram 600 commences at block 602.

At block 602, a set of patches is presented, where the set includes patches that are not installed on a client. For example, the command server 208 presents to a system administrator via the administrative console 222 a set of patches that is not installed on the client 202. In one embodiment, the administrative console 222 displays the set of patches in a graphical user interface on a display device. In one embodiment, the set is determined using operations described in FIG. 7 (see discussion below). The flow continues at block 604.

At block 604, a list of patches selected from the set is received. For example, the command server 208 receives from the administrative console 222 a list of patches selected from the set. In one embodiment, the list was selected by the system administrator via the administrative console 222. The flow continues at block 606.

At block 606, a data set including the list of patches is created and transmitted. For example, the command server 208 creates and transmits a data set including the list of patches to the agent 204. In one embodiment, the data set is represented as an XML file and includes patch configuration information. The flow continues at block 608.

At block 608, an acknowledgment is received. For example, the command server 208 receives from the agent 204 an acknowledgment indicating that certain patches have been installed on the client 202. From block 610, the flow ends.

While the discussion of FIGS. 5 and 6 describes operations for transmitting and installing software patches, the discussion of FIGS. 7 and 8 will describe operations for tracking what patches are needed by a client, according to embodiments of the invention. In one embodiment, the operations shown in FIGS. 7 and 8 determine the set of patches presented to a system administrator at block 602 (see above). In one embodiment, the operations of FIGS. 7 and 8 can be periodically performed for keeping an inventory of patches needed by and installed on a client.

FIG. 7 is a flow diagram illustrating operations for determining and transmitting a list of patches needed by a client, according to exemplary embodiments of the invention. The operations of the flow diagram 700 will be described with reference to the exemplary embodiments of FIGS. 2 and 3. The flow diagram 700 commences at block 702.

At block 702, a data set is received, where the data set includes a list of patches. For example, the agent's patch list receiving unit 304 receives a data set from the command server 208, where the data set includes a list of patches indicating software patches that are available at a particular time for installation on the client 202. The flow continues at block 704.

At block 704, a determination is made about which patches in the list are needed. For example, the patch determination unit 302 determines which of the patches in the list are needed by the client 202. In one embodiment, the determination is based on the patch list (received at 702) and patches currently installed on the client 202. For example, if a patch is in the list but not installed on the client, the patch may be needed. The flow continues at block 706.

At block 706, a data set including a list of needed patches is transmitted. For example, the patch procurement unit 310 transmits to the command server 208 a data set including the list of needed patches. In one embodiment, in addition to the list of needed patches, the data set includes a list of patches already installed on the client 202. In one embodiment, the data set is represented as an XML file. From block 706, the flow ends.

FIG. 8 is a block diagram illustrating operations for receiving a list of patches needed by a client, according to exemplary embodiments of the invention. The operations of the flow diagram 800 will be described with reference to the exemplary embodiments of FIGS. 2 and 3. The flow diagram 800 commences at block 802.

At block 802, the data set including list of patches is transmitted. For example, the command server 208 transmits a list of available patches to the agent 204. The flow continues at block 804.

At block 804, the data set including a list of needed patches is received. For example, the command server 208 receives a list of patches needed by the client 202. In one embodiment, the data set includes a list of patches installed on a client 202. In one embodiment, the command server 208 stores the list of needed patches in the command server data store 212. In one embodiment, the command server 208 can present the list of needed patches to a system administrator via the administrative console, as described above (see FIG. 6). The administrator can use the list of needed patches to guide the command server 208 and the agent 204 in updating patches on the client 202.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" means that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

The invention claimed is:

1. A computer-implemented method comprising:
   installing a patch management agent on a computing device;
   determining a first set of software patches based on a group of software patches installed on the computing device and a group of available software patches;
   receiving at the computing device, the first set of software patches over a network connection;
   after receiving the first set of software patches, determining, by the patch management agent, a second set of software patches based on the group of software patches installed on the computing device and the first set of software patches, wherein the group of software patches installed on the computing device has changed since determining the first set, and wherein the second set is a subset of the first set; and
   installing, by the agent, the second set of software patches on the computing device.

2. The computer-implemented method of claim 1, wherein the receiving is resumeable after an interruption to the network connection.

3. The computer-implemented method of claim 1, wherein the receiving includes, if the network connection is interrupted after part of a software patch has been received, receiving a remainder of the software patch after the network connection is restored.

4. The computer-implemented method of claim 1, wherein installing includes configuring the second set of software patches for operation with a software system of the client computing device.

5. The computer-implemented method of claim 1, wherein the installed software patches have been integrated into a software system of the client computing device and configured for operation with the software system.

6. The computer-implemented method of claim 1, wherein the network connection is non-continuous.

7. The computer-implemented method of claim 1, wherein the network connection is intermittently inoperable.

8. An apparatus comprising:
   a patch management agent installed on a client computing device having a processor and a memory, the client computing device being coupled to a network connection,
   the patch management agent including:
     a patch list receiving unit configured to receive an available software patch list;
     a patch procurement unit configured to receive, over the network connection, a first group of software patches of the available software patch list, wherein after an interruption to the network connection, the patch procurement unit further configured to receive a remaining group of software patches of the available software patch list;
     a patch determination unit configured to determine an installation group of software patches based on which of the first and remaining groups of software patches are not already installed on the client computing device, wherein the installation group is a subset of the first and remaining groups; and
     a patch installation unit configured to install the installation group of software patches on the client computing device.

9. The apparatus of claim 8, wherein the patch determination unit is to determine which of the first and the remaining patches are to be installed based on patches that are installed on the computing device.

10. The apparatus of claim 9, wherein the patch determination unit is to determine which of the first and the remaining patches are to be installed based on whether the client computing device is configurable for installing those of the first and remaining patches to be installed on the client computing device.

11. The apparatus of claim 8, wherein the patch determination unit is to determine which of the first and remaining patches are to be installed based on whether the client computing device includes patches required by those of the first and remaining patches to be installed on the client computing device.

12. The apparatus of claim 8, the patch procurement unit is to receive the patches from a command server via the network connection.

13. The apparatus of claim 8, the patch procurement unit is to receive the patches from a patch server via the network connection.

14. A system comprising:
   a command server, coupled to a network, configured to create a data set indicating patches that are available for installation on a computer, and to store the patches that are available for installation; and
   an agent installed on the computer, the computer having a processor and a memory, the client computer being coupled to the network, the agent configured to:
     receive the data set via the network;
     determine a first set of needed patches, wherein the first set of needed patches includes ones of the patches indicated in the data set that are not installed on the computer;
     request, from the command server, the first set of needed patches via the network;
     receive the first set of needed patches via the network;
     determine that ones of the first set of needed patches have been installed on the computer since the first set of needed patches was determined;
     determine a second set of needed patches, wherein the second set of needed patches includes ones of the first set of needed patches that are not installed on the computer, and wherein the second set of needed patches is a subset of the first set of needed patches; and
     install, on the computer, the second set of needed patches.

15. The system of claim 14, wherein the data set is represented in extensible markup language (XML).

16. The system of claim 14, the command server configured to present the needed patches list on an administrative console.

* * * * *